United States Patent [19]

Singer et al.

[11] Patent Number: 4,911,946

[45] Date of Patent: Mar. 27, 1990

[54] CARBOHYDRATE CREAM SUBSTITUTE

[75] Inventors: Norman S. Singer, Highland Park; Hsien-Hsin Chang, Lake Zurich; Pamela Tang, Palatine; John M. Dunn, Buffalo Grove, all of Ill.

[73] Assignee: The Nutra Sweet Company, Deerfield, Ill.

[21] Appl. No.: 211,494

[22] Filed: Jun. 24, 1988

[51] Int. Cl.$^4$ .................. A23D 3/00; A23L 1/307; A23L 1/29

[52] U.S. Cl. .................. 426/658; 426/804; 426/613; 426/565; 426/567; 426/602; 426/605; 426/589; 426/104

[58] Field of Search .............. 426/104, 658, 613, 804, 426/565, 566, 567, 589, 602, 605

[56] References Cited

U.S. PATENT DOCUMENTS

| | | | |
|---|---|---|---|
| 2,801,242 | 7/1957 | Kerr et al. ............. | 426/568 X |
| 3,023,104 | 2/1962 | Battista ................. | 426/804 |
| 3,573,058 | 3/1971 | Tiemstra ............... | 426/658 |
| 4,103,037 | 7/1987 | Bodor et al. .......... | 426/804 |
| 4,308,294 | 12/1981 | Rispoli ................. | 426/613 |
| 4,375,481 | 3/1983 | Kuwabara et al. ..... | 426/658 |
| 4,510,166 | 4/1985 | Lenchin et al. ........ | 426/565 |
| 4,615,892 | 10/1986 | Morehouse et al. .... | 426/804 |
| 4,734,287 | 3/1988 | Singer .................. | 426/602 |
| 4,828,396 | 5/1989 | Singer et al. .......... | 366/149 |

OTHER PUBLICATIONS

Atwell, et al., Characterization of Quinoa Starch, *Cereal Chem.*, 60:9 (1983).

*Primary Examiner*—Jeanette Hunter
*Attorney, Agent, or Firm*—John M. Sanders

[57] ABSTRACT

A fat substitute is disclosed which comprises water-dispersable macro-colloid particles having a substantially spheroidal shape and a particle size distribution effective to impart substantially smooth organoleptic character of an oil-and-water emulsion. The particles are composed of carbohydrate material.

22 Claims, No Drawings

CARBOHYDRATE CREAM SUBSTITUTE

BACKGROUND OF THE INVENTION

The present invention relates to cream substitutes. In particular, substantially spheroidally shaped carbohydrate particles have a particle size distribution which causes the particles to mimic the mouthfeel of fat or cream in foods. Additionally, the present invention relates to methods of mimicking the mouthfeel of fat/cream and improved food products containing the present carbohydrate particles as a replacement for all or a portion of the fat/cream usually present in the food.

Fat substitutes are known in the art; for example, sucrose polyesters are a known class of liquid polymers useful as fat substitutes. However, sucrose polyesters are known to leach vitamins from the gut making the vitamins unavailable for use by the body. Additionally, the lower molecular weight sucrose polyesters cause a most distressing condition described in the medical and patent literature as "anal leakage." Anti-anal leakage agents for use in conjunction are also described in the literature to be used in conjunction with sucrose polyester fat substitutes. Higher molecular weight sucrose polyesters having viscous/solid/wax-like properties at the human body temperature of about 100° F. are reported to not cause anal leakage. However, these higher molecular weight sucrose polyesters only exhibit fat-like mouthfeel properties at relatively high temperatures requiring the quick ingestion of the food products containing them before they solidify or turn waxy. The utility of those high molecular weight sucrose polyesters is very limited. See, for example, European patent application No. 87870021.0 (Publication No. 0 236 288, published Sept. 9, 1987) and U.S. Pat. Nos. 3,600,186; 4,005,196; 3,954,976; 4,005,195.

Singer et al. U.S. Pat. No. 4,734,287 disclose non-aggregated particles of denatured whey protein as a fat/cream substitute; i.e., substantially smooth emulsion-like organoleptic character. The fat substitutes disclosed by Singer et al. cannot be used in prolonged high temperature applications, i.e. frying, broiling, baking, because the whey protein particles will massively agglomerate thereby loosing the emulsion-like character.

The present invention provides cream substitutes which are generally heat stable and which do not cause anal leakage in a person ingesting them.

It is well known that carbohydrates form gels. Starch and dextran can exist as, or be readily processed into, shperoidal form, such as, for example, SEPHADEX brand cross-linked dextran beads used in column chromatography. These spheroidal forms of carbohydrates can be stabilized to the effects of heat, shear and acid. However, the formation macrocolloidal particles of carbohydrates as described and claimed herein is unknown prior to the present invention.

SUMMARY OF THE INVENTION

Briefly, in accordance with the present invention, carbohydrate particles having a substantially spheroidal shape display fat-like mouthfeel characteristics when the particles have a mean diameter distribution in the range of from about 0.1 to about 2 microns ($\mu$) with less than about 2 percent of the total number of particles over 3$\mu$. The particles are non-aggregated and exhibit a substantially smooth organoleptic character of an oil-in-water emulsion. The present macrocolloid can replace all or a portion of the fat or cream in food products such as ice cream, yogurt, salad dressings, mayonnaise, cream, cream cheese, other cheeses, sour cream, sauces, icings, whipped toppings, frozen confections, milk, coffee whitener and spreads.

Of particular interest, starches, dextran, gums and celluloses are formed into stable suspensions of spheroidal particles having a particle size distribution effective to impart a substantially smooth organoleptic character of an oil-in-water emulsion, i.e., mouthfeel of fat/cream.

DETAILED DESCRIPTION OF THE INVENTION

In practicing the present invention, hydrated carbohydrate particles, having a substantially spheroidal shape and a mean diameter particle size distribution between about 0.1 and about 2 microns ($\mu$) with less than about 2% of the number of particles exceeding 3$\mu$, are added to fat/cream-containing food products to replace all or a portion of the fat/cream normally present in the food. The resulting food products have the creamy mouthfeel of their fatty counterparts.

Any carbohydrate which can attain a substantially spheroidal or substantially round shape in the 0.1–3$\mu$ diameter size range is acceptable in practicing the present invention. Suitable carbohydrates include starches, gums and cellulose. Mixtures of different carbohydrates can also be employed. Preferred carbohydrates include starches because they occur naturally as granules although most commonly-occurring starch granules are much larger than this range. Starches employed in the present invention are modified by cross-linking to prevent excessive swelling of the starch granules beyond this range. Modification by cross-linking is well-known to one skilled in the art. Suitable cross-linking agents include phosphates, phosphorous oxychloride, and dicarboxylic anhydrides. A preferred starch is cross-linked quinoa starch which is a fine starch having granule diameter of between about 1–3$\mu$.

Other suitable carbohydrates include calcium alginate, cross-linked dextran, gellan gum, curdlan, konjac mannan, chitin, schizophyllan and chitosan. Carbohydrates which do not have a natural round shape must be treated so that they attain a substantially spheriodal shape. This can be accomplished by making a solution of the carbohydrate and converting the solution to a gel quickly and uniformly (typically in a field of high shear-force) so that a narrow distribution of a gelled microparticles are formed having the above described diameters, i.e., 0.1–3$\mu$. Typically a stream of carbohydrate solution will be introduced into a highly turbulent reaction zone where the gelled microparticles are formed. High speed mixing and shearing conditions can also be employed.

Calcium alginate macro-colloidal particles are formed by making a solution of sodium alginate and introducing this solution into a calcium ion containing solution through e.g. an ultrasonic spray nozzle or any device producing droplets less than 3$\mu$ diameter. Gellan can be microparticulated by spray cooling a hot gellan solution via any device capable of producing droplets less than 3$\mu$ resulting in the formation of spheriodally-shaped macrocolloidal particles. Konjac mannan can be microparticulated by introducing a solution into a turbulent, heated, alkaline reaction zone.

The apparatus and mixing methods described in copending U. S. patent application Ser. No. 127,710 filed Dec. 2, 1987 entitled "FLUID PROCESSOR APPARATUS" are suitable for making the present microparticulated carbohydrates and this copending application is incorporated herein by reference.

Once the carbohydrate macro-colloidal particles are formed they must be substantially non-aggregated and remain that way. Aggregate blocking agents, for example, lecithin and xanthan gum, can be added to the macrocolloid to stabilize the particles. U.S. Pat. No. 4,734,287 discloses whey protein macrocolloids useful as fat substitutes and aggregate blocking agents. U.S. Patent 4,734,287 is incorporated herein by reference.

The present carbohydrate macrocolloids will contain from about 1 to about 20 percent by weight carbohydrate, depending upon the gelling power of the specific carbohydrate When added to food products, the hydrated macrocolloid is substituted generally on equal weight basis of the fat being removed, i.e., 1 part by weight fat/cream is replaced with 1 part by weight of hydrated macrolloid. More or less macrocolloid can be employed based on the desired creaminess of the resulting food.

In similar embodiments, the various carbohydrate particles described herein act as a fat/cream substitute in foods. The carbohydrate particles are substantially spheroidal in shape and have a particle size distribution effective to impart an organoleptic character of an oil-in-water emulsion, i.e., a cream. The mean diameter particle size distribution ranges from about 0.1 to about $2\mu$, with less than about 2 percent of the total number of particles exceeding 3 microns in diameter.

We claim:

1. A water-dispersable macrocolloid comprising substantially non-aggregated macrocolloidal particles of carbohydrate having a substantially spheroidal shape and a mean particle-size distribution ranging from about 0.1 microns to 2.0 microns, with less than about 2% of the total number of particles exceeding 3.0 microns in diameter, the particles in a hydrated state effective to form a macrocolloid having the substantially smooth organoleptic character of an oil-in-water emulsion.

2. The water-dispersable macrocolloid of claim 1 wherein the particles are comprised of a starch, dextran, gum, cellulose or mixtures thereof.

3. The water-dispersable macrocolloid of claim 2 wherein the particles are a starch.

4. The water-dispersable macrocolloid of claim 1 wherein the particles are cross-linked quinoa starch, cross-linked dextran or calcium alginate.

5. The water-dispersable macrocolloid of claim 2 wherein the particles are comprised of cellulose.

6. The water-dispersable macrocolloid of claim 5 wherein the particles are comprised of cellulose gel.

7. A method of simulating the mouthfeel of fat and/or cream which comprises providing a water-dispersable macrocolloid of substantially non-aggregated hydrated carbohydrate particles having a substantially spheroidal shape and a mean particle size distribution ranging from about 0.1 microns to 2.0 microns, with less than about 2% of the total number of particles exceeding 3.0 microns in diameter, the particles in a hydrated state effective to form a macrocolloid having the substantially smooth organoleptic character of an oil-in-water emulsion.

8. The method of claim 7 wherein the particles are a starch, a gum, cellulose, dextran, or mixtures thereof.

9. The method of claim 7 wherein the particles are a starch.

10. The method of claim 7 wherein the particles are cross-linked quinoa starch, cross-linked dextran or calcium alginate.

11. The method of claim 8 wherein the particles are comprised of cellulose.

12. The method of claim 11 wherein the particles are comprised of a cellulose gel.

13. In a food product containing a fat and/or cream, the improvement which comprises:

substituting for all or a portion of the fat and/or cream, a water-dispersable macrocolloid of substantially non-aggregated hydrated carbohydrate particles having a substantially spheroidal shape and a mean particlesize distribution ranging from about 0.1 microns to 2.0 microns, with less than about 2% of the total number of particles exceeding 3.0 microns in diameter, effective to form a macrocolloid having the substantially smooth organoleptic character of an oil-in-water emulsion.

14. The improved food product of claim 13 wherein the particles are a starch, a gum, cellulose or mixtures thereof.

15. Improved food product of claim 13 wherein the particles are a starch.

16. The improved food product of claim 14 wherein the particles are comprised of cellulose.

17. The improved food product of claim 16 wherein the particles are comprised of a cellulose gel.

18. The improved food product of claim 13 wherein the particles are a starch, a gum, cellulose, dextran or mixtures thereof.

19. The improved food product of claim 18 wherein the particles are a cross-linked quinoa starch, cross-linked dextran or calcium alginate.

20. The improved food product of claim 13 which is ice cream, yogurt, salad dressing, mayonnaise, cream cheese, cheese, milk, an icing, a spread, sour cream, coffee whitener, whipped topping, cream, or a sauce.

21. The improved food product of claim 20 which is ice cream.

22. The improved food product of claim 20 which is salad dressing.

* * * * *